United States Patent
Gao et al.

(10) Patent No.: US 11,909,694 B2
(45) Date of Patent: Feb. 20, 2024

(54) METHODS AND DEVICES FOR DATA TRANSMISSION WITH REFERENCE SIGNALS

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/726,838

(22) Filed: Apr. 22, 2022

(65) Prior Publication Data
US 2022/0255713 A1    Aug. 11, 2022

Related U.S. Application Data

(63) Continuation of application No. 16/633,333, filed as application No. PCT/CN2017/094017 on Jul. 24, 2017, now Pat. No. 11,336,422.

(51) Int. Cl.
| | |
|---|---|
| *H04W 72/04* | (2023.01) |
| *H04L 5/10* | (2006.01) |
| *H04L 5/00* | (2006.01) |
| *H04L 27/26* | (2006.01) |
| *H04W 24/08* | (2009.01) |
| *H04W 72/23* | (2023.01) |

(52) U.S. Cl.
CPC ............ *H04L 5/10* (2013.01); *H04L 5/0051* (2013.01); *H04L 27/2605* (2013.01); *H04W 24/08* (2013.01); *H04W 72/23* (2023.01)

(58) Field of Classification Search
CPC ............ H04W 24/08; H04W 72/0446; H04W 72/042; H04W 72/1294; H04W 72/044; H04L 5/0051; H04L 5/0094; H04L 5/10; H04L 5/005; H04L 5/009; H04L 27/2605
See application file for complete search history.

(56) References Cited

U.S. PATENT DOCUMENTS

| | | | |
|---|---|---|---|
| 2013/0294318 A1 | 11/2013 | Amerga et al. | |
| 2014/0092827 A1 | 4/2014 | Jongren et al. | |
| 2014/0119266 A1* | 5/2014 | Ng | H04L 1/0067 370/312 |
| 2014/0314000 A1 | 10/2014 | Liu et al. | |

(Continued)

FOREIGN PATENT DOCUMENTS

| | | |
|---|---|---|
| CN | 103391576 A | 11/2013 |
| CN | 104704755 A | 6/2015 |

(Continued)

OTHER PUBLICATIONS

Communication dated Nov. 16, 2021 from the Chinese Patent Office in Chinese Application No. 201780093453.5.

(Continued)

*Primary Examiner* — Wei Zhao
(74) *Attorney, Agent, or Firm* — Sughrue Mion, PLLC

(57) ABSTRACT

Embodiments of the present disclosure relate to methods and devices for data transmission. In example embodiments, a method implemented in a network device is provided. According to the method, a target RS port group is determined from a plurality of RS ports for transmitting a RS. The RS ports are associated with at least one network device. Then, a configuration of the target RS port group is transmitted to the terminal device.

21 Claims, 7 Drawing Sheets

(56) References Cited

U.S. PATENT DOCUMENTS

| 2015/0003356 | A1* | 1/2015 | Seo ..................... H04L 5/0058 |
| | | | 370/329 |
| 2015/0271814 | A1 | 9/2015 | Park et al. |
| 2018/0278395 | A1 | 9/2018 | Yoon |
| 2018/0288745 | A1* | 10/2018 | Davydov ............. H04L 5/0062 |
| 2020/0154467 | A1 | 5/2020 | Gong et al. |

FOREIGN PATENT DOCUMENTS

| WO | 2013/110212 A1 | 8/2013 |
| WO | 2014/049496 A1 | 4/2014 |
| WO | 2016/159621 A1 | 10/2016 |

OTHER PUBLICATIONS

Written Opinion of the International Searching Authority of PCT/CN2017/094017 dated Mar. 29, 2018.
International Search Report of PCT/CN2017/094017 dated Mar. 29, 2018.
Notification to Grant Patent dated Jun. 6, 2022 in Chinese Application No. 201780093453.5.

* cited by examiner

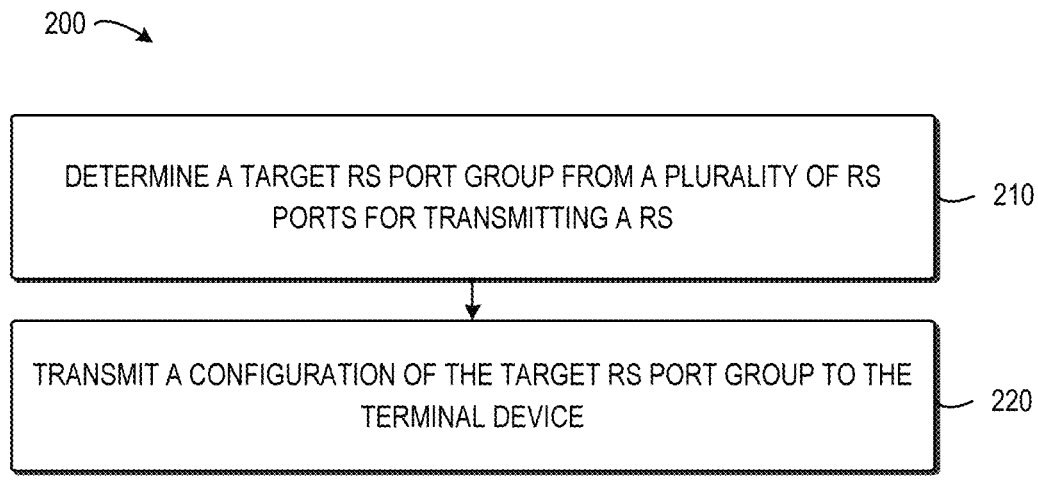
FIG. 2
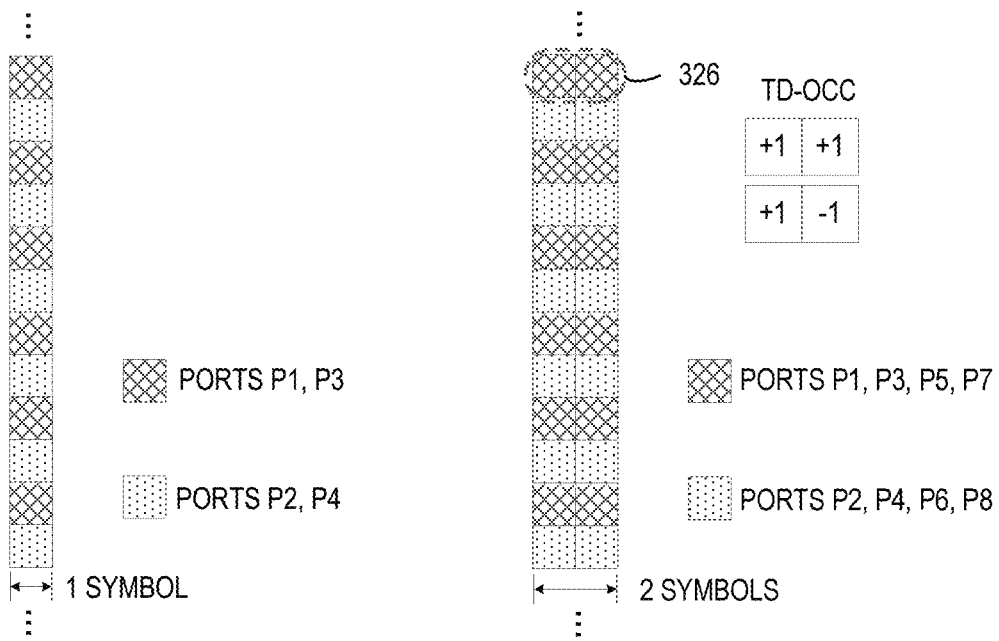
FIG. 3A
FIG. 3B

| Port # | Comb offset# | CS id# | TD-OCC |
|---|---|---|---|
| P1 | 0 | 1 | {1 1} |
| P2 | 1 | 1 | {1 1} |
| P3 | 0 | 2 | {1 1} |
| P4 | 1 | 2 | {1 1} |
| P5 | 0 | 1 | {1 -1} |
| P6 | 1 | 1 | {1 -1} |
| P7 | 0 | 2 | {1 -1} |
| P8 | 1 | 2 | {1 -1} |

GROUP 1

| Port # | Comb offset # | CS id # | TD-OCC |
|---|---|---|---|
| P1 | 0 | 1 | {1  1} |
| P3 | 0 | 2 | {1  1} |
| P5 | 0 | 1 | {1 -1} |
| P7 | 0 | 2 | {1 -1} |

FIG. 4B

GROUP 2

| Port # | Comb offset # | CS id # | TD-OCC |
|---|---|---|---|
| P2 | 1 | 1 | {1  1} |
| P4 | 1 | 2 | {1  1} |
| P6 | 1 | 1 | {1 -1} |
| P8 | 1 | 2 | {1 -1} |

FIG. 4C

GROUP 1

| Port # | Comb offset # | CS id # | TD-OCC |
|---|---|---|---|
| P1 | 0 | 1 | {1  1} |
| P2 | 0 | 2 | {1  1} |
| P3 | 1 | 1 | {1  1} |
| P4 | 1 | 2 | {1  1} |

FIG. 4D

GROUP 2

| Port # | Comb offset # | CS id # | TD-OCC |
|---|---|---|---|
| P5 | 0 | 1 | {1 -1} |
| P6 | 0 | 2 | {1 -1} |
| P7 | 1 | 1 | {1 -1} |
| P8 | 1 | 2 | {1 -1} |

FIG. 4E

METHODS AND DEVICES FOR DATA TRANSMISSION WITH REFERENCE SIGNALS

CROSS REFERENCE TO RELATED APPLICATIONS

This is a continuation application of U.S. application Ser. No. 16/633,333 filed Jan. 23, 2020, which is a National Stage of International Application No. PCT/CN2017/094017 filed Jul. 24, 2017, the contents of all of which are incorporated herein by reference in their entirety.

TECHNICAL FIELD

Embodiments of the present disclosure generally relate to the field of communications, and in particular, to methods and devices for data transmission.

BACKGROUND

With the development of communication technologies, multi-antenna schemes, such as beam management, reference signal transmission, and so on, are studied for new radio access (NR). In downlink transmission, a network device (for example, an eNB, a gNB, or a Transmission Reception Point (TRP)) transmits a downlink RS, such as a Demodulation Reference Signal (DMRS), a Channel State Information-Reference Signal (CSI-RS), and a Sounding Reference Signal (SRS), to a terminal device (for example, user equipment (UE)). Upon receipt of the RS, the terminal device may perform quality measurement of the channel between the network device and the terminal device, estimation of the channel, and so on. Generally, in the downlink transmission, control information including configuration of the RS may be transmitted on a Physical Downlink Control Channel (PDCCH), and data is transmitted on a Physical Downlink Shared Channel (PDSCH).

It has been proposed that a single NR-PDCCH schedules a single NR-PDSCH where separate RS ports (layers) are transmitted from separate TRPs, and multiple NR-PDCCHs each schedules a respective NR-PDSCH, where each NR-PDSCH is transmitted from a separate TRP.

Under a scenario of multi-TRP PDSCH transmission, coordination of the DMRS from multiple TRPs needs to ensure orthogonality. For instance, when multiple PDCCHs scheduling multiple PDSCHs, the UE also needs to differentiate which RS port(s) are from a first TRP and which RS port(s) are from a second TRP. In other words, there is a need to indicate the RS port(s) used in RS transmission.

SUMMARY

In general, example embodiments of the present disclosure provide methods and devices for data transmission.

In a first aspect, there is provided a method implemented in a network device. According to the method, the network device determines a target RS port group from a plurality of RS ports for transmitting a RS. The plurality of RS ports are associated with at least one network device. Then, the network device transmits a configuration of the target RS port group to the terminal device.

In a second aspect, there is provided a method implemented in a terminal device. According to the method, the terminal device receives a configuration of a target RS port group from a network device. The target RS port group is determined from a plurality of RS ports for transmitting a RS to the terminal device. The plurality of RS ports are associated with at least one network device.

In a third aspect, there is provided a network device. The network device comprises a processor and a memory coupled to the processor. The memory stores instructions that when executed by the processor, cause the network device to performs actions. The actions comprise: determining a target RS port group from a plurality of RS ports for transmitting a RS, the plurality of RS ports being associated with at least one network device; and transmitting a configuration of the target RS port group to the terminal device.

In a fourth aspect, there is provided a terminal device. The terminal device comprises a processor and a memory coupled to the processor. The memory stores instructions that when executed by the processor, cause the network device to performs actions. The actions comprise: receiving a configuration of a target reference signal (RS) port group from a network device, the target RS port group being determined from a plurality of RS ports for transmitting a RS to the terminal device, the plurality of RS ports being associated with at least one network device.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 2 shows a flowchart of a method 200 for configuring a RS port group in accordance with some embodiments of the present disclosure;

FIGS. 3A-3F show schematic diagrams of RS patterns according to embodiments of the present disclosure, respectively;

FIGS. 4A-4E show schematic diagrams of group partition of DMRS ports according to embodiments of the present disclosure, respectively;

Throughout the drawings, the same or similar reference numerals represent the same or similar element.

DETAILED DESCRIPTION

Figure 1A:
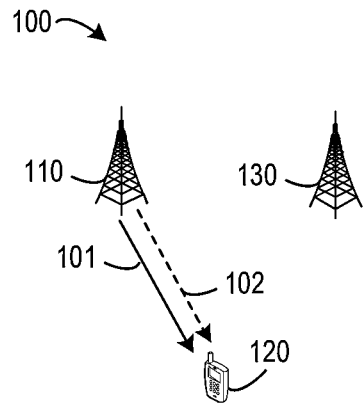
FIGS. 1A-1F are schematic diagrams 100, 150, 160, 170, 180 and 190 of a communication environments in which embodiments of the present disclosure can be implemented, respectively.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like. For the purpose of discussion, in the following, some embodiments will be described with reference to TRP as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1A shows an example communication network 100 in which embodiments of the present disclosure can be implemented. The network 100 includes two network devices (for example, TRPs) 110 and 130 and a terminal device (for example, a UE) 120. The network device 110 transmits data, for example, a DMRS sequence, to the terminal device 120 via a plurality of RS ports (layers) on a PDSCH 101, and the PDSCH 101 is scheduled by a PDCCH 102. The network device 130 does not communicate with the terminal device 120. The example of FIG. 1A illustrates a scenario (also referred to as "scenario 1" hereafter) of 1-TRP with a plurality of layers.

Figure 1B:
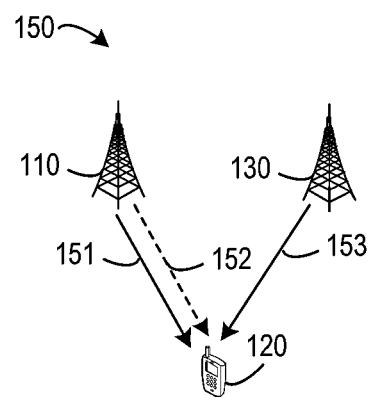

FIG. 1B shows another example communication network 150 in which embodiments of the present disclosure can be implemented. The network 150 also includes two network devices 110 and 130 and a terminal device 120. The network device 110 and 130 transmit data, for example, DMRS sequences, to the terminal device 120 via PUSCH with a plurality of layers or ports 151 and 153, which are scheduled by a PDCCH 152. The reference numbers 151 and 153 refer to different RS ports that use the same PDSCH. In particular, the RS ports 151 are some layers of the PDSCH that are used for transmission from network device 110, and the RS ports 153 are other layers of the PDSCH that are used for transmission from network device 130. The example of FIG. 1B illustrates a scenario (also referred to as "scenario 2" hereafter) of a plurality of TRPs with 1 PDCCH and a PDSCH with plurality of layers or ports.

Figure 1C:
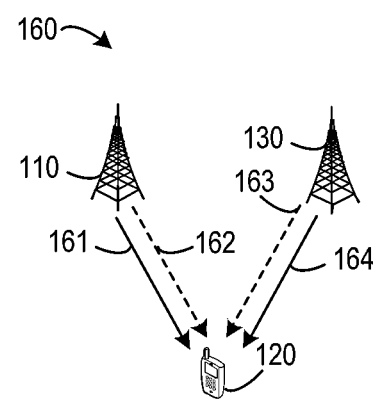

FIG. 1C shows still another example communication network 160 in which embodiments of the present disclosure can be implemented. The network 160 includes two network devices 110 and 130, and a terminal device 120. The network device 110 and 130 transmit data, for example, DMRS sequences, to the terminal device 120 via PDSCHs 161 and 164, which are scheduled by PDCCHs 162 and 163, respectively. The example of FIG. 1C illustrates a scenario (also referred to as "scenario 3" hereafter) of a plurality of TRPs with a plurality of PDCCHs and a plurality of PDSCHs.

Figure 1D:
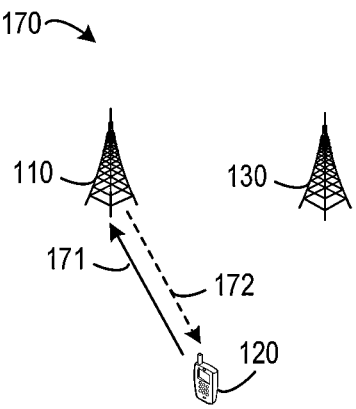

FIG. 1D shows an example communication network 170 in which embodiments of the present disclosure can be implemented. The network 170 includes two network devices (for example, TRPs) 110 and 130 and a terminal device (for example, a UE) 120. The terminal device 120 transmits data, for example, a DMRS sequence, to the network device 110 via a plurality of RS ports (layers) on a PUSCH 171, and the PUSCH 171 is scheduled by a PDCCH 172. The network device 130 does not communicate with the terminal device 120. The example of FIG. 1D illustrates a scenario (also referred to as "scenario 1-A" hereafter) of 1-TRP with a plurality of layers.

Figure 1E:
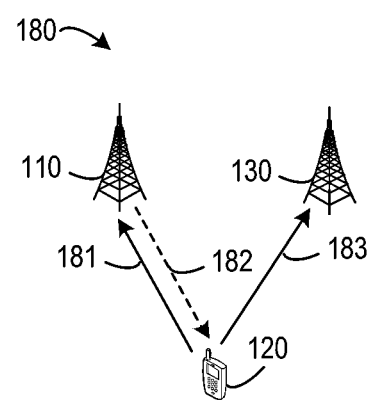

FIG. 1E shows another example communication network 180 in which embodiments of the present disclosure can be implemented. The network 180 also includes two network devices 110 and 130 and a terminal device 120. The terminal device 120 transmits data, for example, DMRS sequences, to the network device 110 and 130 via PUSCH with a plurality of layers or ports 181 and 183, which are scheduled by a PDCCH 182. The reference numbers 181 and 183 refer to different RS ports that use the same PUSCH. In particular, the RS ports 181 are some layers of the PUSCH that are used for transmission to the network device 110, and the RS ports 183 are other layers of the PUSCH that are used for transmission to network device 130. The example of FIG. 1E illustrates a scenario (also referred to as "scenario 2-A" hereafter) of a plurality of TRPs with 1 PDCCH and a PUSCH with plurality of layers or ports.

Figure 1F:
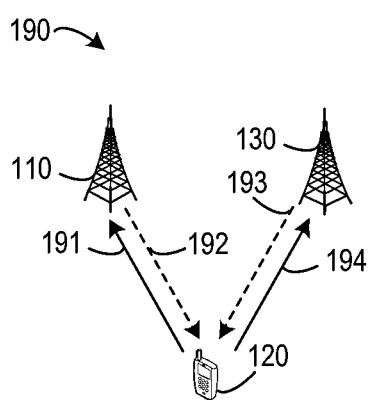

FIG. 1F shows still another example communication network 190 in which embodiments of the present disclosure can be implemented. The network 190 includes two network devices 110 and 130, and a terminal device 120. The terminal device transmits data, for example, DMRS sequences, to the network device 110 and 130 via PUSCHs 191 and 194, which are scheduled by PDCCHs 192 and 193, respectively. The example of FIG. 1F illustrates a scenario (also referred to as "scenario 3-A" hereafter) of a plurality of TRPs with a plurality of PDCCHs and a plurality of PUSCHs.

It is to be understood that the number of base stations and terminal devices is only for the purpose of illustration without suggesting any limitations. The networks 100, 150, 160, 170, 180 and 190 may include any suitable number of network devices and/or the terminal devices adapted for implementing embodiments of the present disclosure.

Conventionally, under a scenario of multi-TRP PDSCH transmission, for example, the scenario 2 or 3, coordination of the DMRS from multiple TRPs needs to ensure orthogonality. For instance, when multiple PDCCHs scheduling multiple PDSCHs, the UE needs to differentiate which RS port(s) are from a first TRP and which RS port(s) are from a second TRP. In addition, as to the scenario 2-A or 3-A, when multiple PDCCHs scheduling multiple PUSCHs, the UE needs to differentiate which RS port(s) are from a first TRP and which RS port(s) are from a second TRP.

For multi-layer transmission in LTE, DMRS sequence and port configuration needs to be signaled to UE in non-codebook-based Multiple-Input Multiple-Output (MIMO). In LTE-A, a segment in Downlink Control Information (DCI) format 2C and 2D, DMRS port(s) and sequence(s) may be indicated by antenna port(s), scrambling identity and number of layers. The following Table 1 shows an example of the antenna port(s), scrambling identity and number of layers indication.

TABLE 1

| One Codeword:<br>Codeword 0 enabled,<br>Codeword 1 disabled | | Two Codewords:<br>Codeword 0 enabled,<br>Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

However, in NR, maximum 12 orthogonal downlink DMRS ports are supported and more flexibility for scheduling is preferred. As such, the DCI overhead is large, which is undesirable. In addition, the DCI segment has to assign different DMRS sequences to different UEs, which is unsuitable for multiple PDCCHs.

In order to solve the problems above and one or more of other potential problems, a solution for RS configuration is provided in accordance with example embodiments of the present disclosure. With the solution, RS ports from different TRPs can be partitioned into different groups. By means of only transmitting configuration of a portion of the RS ports, for example, a RS port group, to the terminal device, DCI overhead can be reduced. In addition, interference on RSs can be avoided.

Principle and implementations of the present disclosure will be described in detail below with reference to FIGS. 2-9, in which FIG. 2 shows a flowchart of a method 200 for configuring a RS port group in accordance with some embodiments of the present disclosure. With the method 200, the above and other potential deficiencies in the conventional approaches can be overcome. It would be appreciated by those skilled in the art that the method 200 may be implemented by a network device, such as a network device 110 or 130, or other suitable devices.

The method 200 is entered at 210, where a target RS port group is determined from a plurality of RS ports for transmitting a RS. The plurality of RS ports is associated with at least one network device.

According to embodiments of the present disclosure, the RS may include one or more of: a Demodulation Reference Signal (DMRS), a Channel State Information Reference Signal (CSI-RS), a Sounding Reference Signal (SRS), a Phase Tracking Reference Signal (PTRS), Tracking Reference Signal (TRS), and/or the like. For purpose of discussion, some embodiments of the present disclosure are described with reference to DMRS as examples of the RS.

In some embodiments, the target RS port group is used for transmitting a RS to the terminal device. Alternatively, or in addition, the target RS port group may be used for the terminal device to transmit a RS to the network device. In this case, the network device may receive the RS via the target RS port group from the terminal device.

In some embodiments, a set of RS ports may be configured. In one embodiment, the number of RS ports may be 4, for example, the ports are {P1, P2, P3, P4}, where each of P1-P4 is a RS port. In another embodiment, the number of RS ports may be 6, for example, the ports are {P1, P2, P3, P4, P5, P6}, where each of P1-P6 is a RS port. In another embodiment, the number of RS ports may be 8, the ports are {P1, P2, P3, P4, P5, P6, P7, P8}, where each of P1-P8 is a RS port. In another embodiment, the number of RS ports may be 12, the ports are {P1, P2, P3, P4, P5, P6, P7, P8, P9, P10, P11, P12}, where each of P1-P12 is a RS port.

Figure 3C:
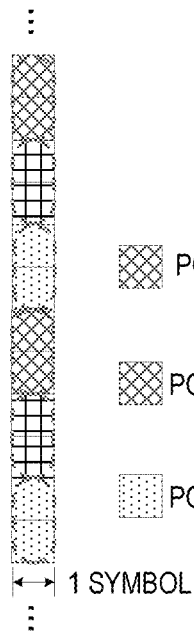

FIGS. 3A-3F show schematic diagrams of RS patterns according to embodiments of the present disclosure, respectively. As shown in FIG. 3A, ports P1 and P3 are mapped in the same symbol, and multiplexed with CDM in frequency domain, e.g. cyclic shift (port P1 and P3 are configured with different cyclic shift values). In this example, ports P2 and P4 are mapped in the same symbol, and multiplexed with CDM in frequency domain, e.g. cyclic shift (port P2 and P4 are configured with different cyclic shift values). Port P1 and/or port P3 are multiplexed with FDM with port P2 and/or port P4. For example, port P1 and/or port P3 are configured with different comb offset values from port P2 and/or port P4 (e.g. Interleaved Frequency Division Multiplexing Access (IFDMA)). For example, the pattern as shown in FIG. 3A may be configured at DMRS configuration type 1 with 1 symbol.

In embodiments described with reference to FIG. 3B, ports P1 and P3 are mapped in the 2 symbols, and multiplexed with CDM in frequency domain, e.g. cyclic shift (port P1 and P3 are configured with different cyclic shift values). Ports P2 and P4 are mapped in the 2 symbols, and multiplexed with CDM in frequency domain, e.g. cyclic shift (port P2 and P4 are configured with different cyclic shift values). Ports P5 and P7 are mapped in the 2 symbols, and multiplexed with CDM in frequency domain, e.g. cyclic shift (port P5 and P7 are configured with different cyclic shift values). Ports P6 and P8 are mapped in the 2 symbols, and multiplexed with CDM in frequency domain, e.g. cyclic shift (port P6 and P8 are configured with different cyclic shift values).

In the example of FIG. 3B, port P1 and/or port P3 are multiplexed with CDM in time domain (e.g. TD-OCC) with port P5 and/or port P7. For instance, port P1 and/or port P3 are configured with different OCC values from port P5 and/or port P7 in time domain, e.g. port P1 and/or port P3 are configured with OCC {1, 1} in the 2 adjacent resource elements (REs). In the embodiments shown with respect to FIG. 3B, where the 2 REs are in same frequency location and in 2 different symbols, port P5 and/or port P7 are configured with OCC {1, −1} in the 2 adjacent REs.

In addition, port P2 and/or port P4 may be multiplexed with CDM in time domain (e.g. TD-OCC) with port P6 and/or port P8. Port P2 and/or port P4 may be configured with different OCC values from port P6 and/or port P8. For example, port P2 and/or port P4 are configured with OCC {1, 1} in the 2 adjacent REs in time domain, and port P6 and/or port P8 are configured with OCC {1, −1} in the 2 adjacent REs in time domain.

Port P1 and/or P3 and/or P5 and/or P7 may be multiplexed with port P2 and/or P4 and/or P6 and/or P8 with FDM manner. By way of example, port P1 and/or P3 and/or P5 and/or P7 are configured with different resources in frequency domain from those of with port P2 and/or P4 and/or P6 and/or P8. For instance, port P1 and/or P3 and/or P5 and/or P7 are configured with different comb offset values from those of with port P2 and/or P4 and/or P6 and/or P8. For example, the pattern as shown in FIG. 3B may be configured at DMRS configuration type 1 with 2 symbols.

In embodiments described with reference to FIG. 3C, ports P1 and P2 are mapped in the same symbol, and multiplexed with CDM in frequency domain, e.g. FD-OCC (e.g. port P1 is configured with OCC {1, 1} in the 2 adjacent REs in frequency domain, where the 2 REs are in same symbol and 2 different frequency resource elements, and port P2 may be configured with OCC {1, −1} in 2 adjacent REs in frequency domain.

Ports P3 and P4 are mapped in the same symbol, and multiplexed with CDM in frequency domain, e.g. FD-OCC.

Ports P5 and P6 are mapped in the same symbol, and multiplexed with CDM in frequency domain, e.g. FD-OCC.

Port P1 and/or port P2 are multiplexed with FDM with port P3 and/or port P4. For example, port P1 and/or port P2 are configured with resources in frequency domain from port P3 and/or port P4.

Port P1 and/or port P2 are multiplexed with FDM with port P5 and/or port P6. For example, port P1 and/or port P2 are configured with resources in frequency domain from port P5 and/or port P6.

Port P3 and/or port P4 are multiplexed with FDM with port P5 and/or port P6. For example, port P3 and/or port P4 are configured with resources in frequency domain from port P5 and/or port P6.

Figure 3D:
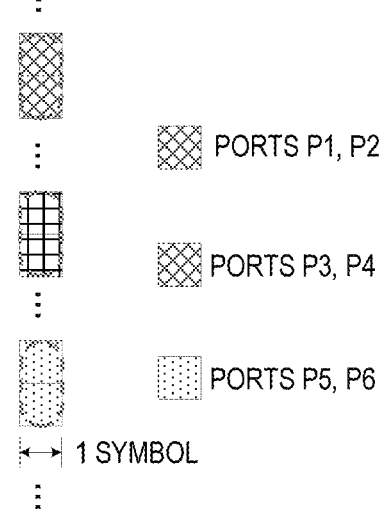

It is to be understood that the embodiments show with respect to FIG. 3C are for purpose of illustration, rather than limitation. Those skilled in the art would appreciate that the resources for port P1 and/or P2 and the resources for port P3 and/or P4 and the resources for port P5 and/or P6 may be adjacent and/or non-adjacent. Embodiments described with reference to FIG. 3D illustrate another example for DMRS configuration with 1 symbol. In the example of FIG. 3D, the resources for ports P1, P2, ports P3, P4 and ports P5, P6 are non-adjacent. For example, the pattern as shown in FIG. 3C or FIG. 3D may be configured at DMRS configuration type 2 with 1 symbol.

In embodiments described with reference to FIG. 3E, ports P1, P2 are mapped in the same symbol, and multiplexed with CDM in frequency domain, e.g. FD-OCC. By way of example, port P1 is configured with OCC {1, 1} in the 2 adjacent REs in frequency domain, where the 2 REs are in same symbol and 2 different frequency resource elements, and port P2 may be configured with OCC {1, −1} in 2 adjacent REs in frequency domain.

Ports P3 and P4 are mapped in the same symbol, and multiplexed with CDM in frequency domain, e.g. FD-OCC.

Ports P5 and P6 are mapped in the same symbol, and multiplexed with CDM in frequency domain, e.g. FD-OCC.

Port P1 and/or port P2 and port P7 and/or port P8 are multiplexed with CDM in time domain, e.g. TD-OCC. For example, port P1 and/or P2 may be configured with OCC {1, 1} in time domain, port P7 and/or P8 may be configured with OCC {1, −1} in time domain.

Port P3 and/or port P4 and port P9 and/or P10 are multiplexed with CDM in time domain, e.g. TD-OCC. For example, port P3 and/or P4 may be configured with OCC {1, 1} in time domain, port P9 and/or P10 may be configured with OCC {1, −1} in time domain.

Port P5 and/or port P6 and port P11 and/or P12 are multiplexed with CDM in time domain, e.g. TD-OCC. For example, port P5 and/or P6 may be configured with OCC {1, 1} in time domain, port P11 and/or P12 may be configured with OCC {1, −1} in time domain.

Port P1 and/or port P2 and/or port P7 and/or port P8 are multiplexed with FDM with port P3 and/or port P4 and/or port P9 and/or port P10. For example, port P1 and/or port P2 and/or port P7 and/or port P8 are configured with resources in frequency domain from port P3 and/or port P4 and/or port P9 and/or port P10.

Port P3 and/or port P4 and/or port P9 and/or port P10 are multiplexed with FDM with port P5 and/or port P6 and/or port P11 and/or port P12. For example, Port P3 and/or port P4 and/or port P9 and/or port P10 are configured with resources in frequency domain from port P5 and/or port P6 and/or port P11 and/or port P12.

Port P1 and/or port P2 and/or port P7 and/or port P8 are multiplexed with FDM with port P5 and/or port P6 and/or port P11 and/or port P12. For example, port P1 and/or port P2 and/or port P7 and/or port P8 are configured with resources in frequency domain from port P5 and/or port P6 and/or port P11 and/or port P12.

Figure 3E:
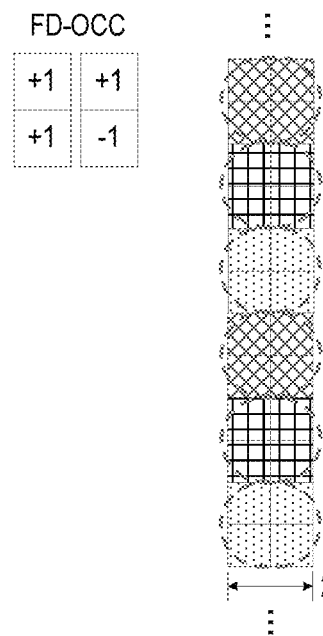
Figures 3F, 4A:
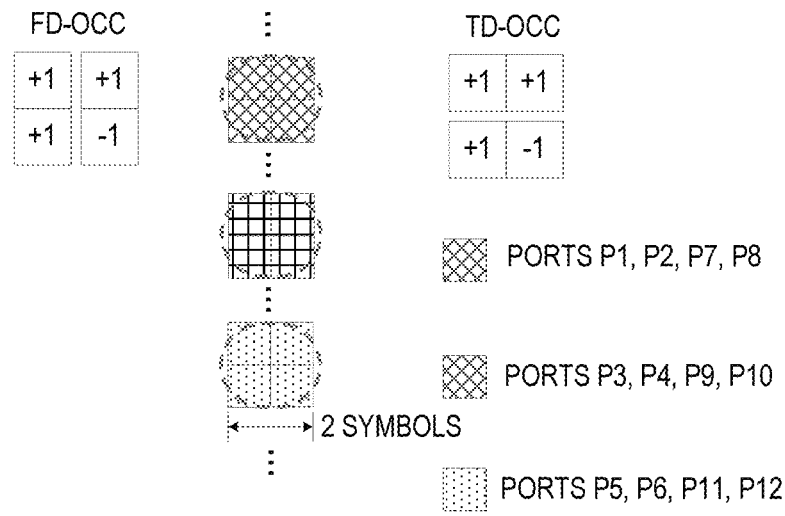

It is to be understood that the embodiments show with respect to FIG. 3E are for purpose of illustration, rather than limitation. Those skilled in the art would appreciate that the resources for port P1 and/or P2 and/or P7 and/or P8 and the resources for port P3 and/or P4 and/or P9 and/or P10 and the resources for port P5 and/or P6 and/or P11 and/or P12 may be adjacent and/or non-adjacent. Embodiments described with reference to FIG. 3F illustrate another example for DMRS configuration with 2 symbols. In the example of FIG. 3F, the resources for ports P1, P2, P7, P8 ports P3, P4, P9, P10 and ports P5, P6, P11, P12 are non-adjacent. For example, the pattern as shown in FIG. 3E or FIG. 3F may be configured at DMRS configuration type 2 with 2 symbols.

It is to be understood that the port index P1-P12 in FIGS. 3A-3F are only for the purpose of illustration without suggesting any limitations. The P1-P12 may be the port index with any suitable number and/or any suitable order adapted for implementing embodiments of the present disclosure.

In some embodiments, a configuration of the RS is transmitted to the terminal device. In some embodiments, the configuration of the RS may be at least one of DMRS configuration type, for example DMRS configuration type 1 and DMRS configuration type 2, number of DMRS symbols for frontloaded DMRS, for example 1 or 2 symbols of the frontloaded DMRS, existing of additional DMRS, number of symbols for additional DMRS. In some embodiments, the configuration of the RS may be included in a higher layer signaling, for example, a Radio Resource Control (RRC) signaling or a Media Access Control (MAC) signaling, and so on, and the configuration may be transmitted via the high level signaling. Alternatively or in addition, the configuration of RS may be transmitted via a dynamic signaling, such as Downlink Control Information (DCI), or other suitable signaling transmitted on the downlink channel.

In some embodiments, configuration of communication between one terminal device and multiple TRPs or cells may be configured to a terminal device. For example, the configuration may include at least one of monitoring multiple PDCCHs from different TRPs or cells, configurations of RS from different TRPs or cells, receiving multiple PDSCHs from different TRPs or cells, receiving one PDSCH and different layers or ports from different TRPs or cells. In some embodiments, when the configuration of multiple TRPs or cells communication is configured to a terminal device, at least one of the RS configurations from different TRPs or cells should be same. For example, the DMRS configuration type should be same for different TRPs or cells. For another example, the number of DMRS symbols should be same for different TRPs or cells, for example, the number may be number of DMRS symbols for frontloaded DMRS and/or additional DMRS. For another example, the existing of additional DMRS should be same for different TRPs or cells. In one embodiment, when the UE is configuration with communication with multiple TRPs or cells, UE may not assume at least one of the RS configurations different for different TRPs or cells.

In some embodiments, configurations of maximum number of RS ports and/or configurations of number of RS ports and/or configurations of number of DMRS symbols and/or existing of additional DMRS and/or maximum number of CWs and/or number of CWs may be configured to a terminal device. In some embodiments, based on different configurations, communication between the terminal device and multiple TRPs or cells may have different conditions, for example, based on some configurations, the communication between the terminal device and multiple TRPs or cells may not be supported. For one example, when the (maximum) number of RS ports is 4 and/or (maximum) number of CWs is 1 and/or additional DMRS exists and/or the number of DMRS symbols is 1, the communication between the terminal device and multiple TRPs or cells may not be supported. In one embodiment, when some of the configurations is configured to UE, UE may not assume the communication will be with multiple TRPs or cells.

In some embodiments, the RS ports may be divided into one or more RS port groups. Then, a configuration may be determined for each of the RS port groups. The RS ports may be divided in several ways, for example, system conditions, standards requirements, time/frequency offset, delay spread, frequency spread, and/or the like. In an embodiment, the RS ports may be divided into a plurality of Quasi-Co-Location (QCL) groups. In such a case, a RS port group may be a QCL group.

In some embodiments, whether the RS ports are divided into groups or the number of RS port groups may be determined based on some configurations. For example, when the number of frontloaded DMRS symbols is 1, the RS ports may not be divided into groups, or for example, the RS ports groups number is 1. For another example, when additional DMRS is configured, the RS ports may not be divided into groups, or for example, the number of the RS port group is 1.

In some embodiments, the configuration of a RS port group may include a variety of factors, for example, but not limited to, size of the RS port group, RS ports in the RS port group, an identification of the network device, a RS sequence, an initial value of the RS sequence, and/or the like. It is to be understood these examples are just described for illustration, rather than suggesting any limitation. Those skilled in the art would appreciate that the configuration of the RS port group may further include information about symbol(s) and/or resource element(s) used by RS port(s) in the RS port group, a multiplexing mode of RS port(s) in the RS port group, and so on.

In some embodiments, UE may be configured with a plurality of groups, and each group may include at least one of the RS ports, and different groups may correspond to different TRPs and/or cells and/or panels. In some embodiments, the groups may have same or different number of RS ports. And the RS ports in different groups may be non-overlapped and/or fully-overlapped and/or partial overlapped. In some embodiments, the RS ports in some groups may have different index order.

In some embodiments, the RS ports in the RS port group may at least include the RS ports multiplexed with CDM in frequency domain. That is, the RS ports which are mapped with same time and frequency resource with the RS port and multiplexed with CDM in frequency and/or time domain may be included in the same RS port group. For example, as shown in FIG. 3A, at least P1 and P3 should be in one group, or at least P2 and P4 should be in one group. For example, as shown in FIG. 3B, at least P1 and P3 should be in one group, or at least P2 and P4 should be in one group, or at least P5 and P7 should be in one group, or at least P6 and P8 should be in one group, or at least P1 and P3 and P5 and P7 should be in one group, or at least P2 and P4 and P6 and P8 should be in one group. For example, as shown in FIG. 3C or FIG. 3D, at least P1 and P2 should be in one group, or at least P3 and P4 should be in one group, or at least P5 and P6 should be in one group. For example, as shown in FIG. 3E or FIG. 3F, at least P1 and P2 should be in one group, or at least P3 and P4 should be in one group, or at least P5 and P6 should be in one group, or at least P7 and P8 should be in one group, or at least P9 and P10 should be in one group, or at least P11 and P12 should be in one group, or at least P1 and P2 and P7 and P8 should be in one group, or at least P3 and P4 and P9 and P10 should be in one group, or at least P5 and P6 and P11 and P12 should be in one group. In some embodiments, with different DMRS type configurations, the ports index in DMRS port groups may be different.

In some embodiments, different RS port groups may be configured for different TRPs or cells. For example, for communication between one terminal device and two TRPs or cells, two RS port groups may be configured for the terminal device. And one RS port group may be the RS ports correspond to one TRP, and the other RS port group may be the RS ports correspond to the other TRP. For one example, when UE is configured with DMRS configuration type 1, the two RS port groups may be {P1, P2, P3, P4} and {P5, P6, P7, P8} or the two RS port groups may be {P1, P3, P5, P7} or {P2, P4, P6, P8}. For another example, when UE is configured with DMRS configuration type 2, the two RS port groups may be two groups of {P1, P2, P3, P4} or {P5, P6, P7, P8} or {P9, P10, P11, P12} or the two RS port groups may be two groups of {P1, P2, P7, P8} or {P3, P4, P9, P10} or {P5, P6, P11, P12}.

In some embodiments, different RS port orders may be configured for different TRPs or cells. For example, for communication between one terminal device and two TRPs or cells, two RS port orders may be configured for the terminal device. One RS port order may be the RS ports corresponding to one TRP, and the other RS port order may be the RS ports corresponding to the other TRP. In an example, the two RS port orders may be {A, B, C, D, E, F, G, H} and {F, G, F, E, D, C, B, A}. In another example, the two RS port orders may be {A, B, C, D, E, F, G, H} and {E, F, G, H, A, B, C, D}.

According to embodiments of the present disclosure, in consideration of UE's ability, the size of the RS port group may be 4 (corresponding to 1 codeword (CW)), 8 (corresponding to 1 CW/2 CWs) or other suitable value. In some embodiments, the UE may be configured with a RS port group in Scenario 1 or 1-A, the number of RS ports in the RS port group may be N, and the RS ports may be N ports selected from P1-P12, for example, the number of RS ports in the RS port group is 4 or 8. An example of partition of the RS port group in Scenario 1 or 1-A is shown in Table 2. UE may be configured with any one or two rows in Table 2.

TABLE 2

| Ports | TRP1 | TRP2 |
|---|---|---|
| Up to 4 | {A, B, C, D} | |
| Up to 8 | {A, B, C, D, E, F, G, H} | |

In the Scenario 1 or 1-A, the UE only connects with one TRP, that is, the UE is in a single TRP transmission. As shown in Table 2, if the number of the RS ports is up to 4, the target RS port group may be {A, B, C, D}, where each of {A, B, C, D} is a RS port, and may be any ports selected from the ports P1-P12. If the number of the RS ports is up to 8, the target RS port group may be {A, B, C, D, E, F, G, H}, where each of {A, B, C, D, E, F, G, H} is a RS port, and may be any ports selected from the ports P1-P12.

In addition or alternatively, in Scenario 2 or 2-A of multiple TRPs transmission and a single PDCCH, the UE may be configured with one RS port group, for example, with size 8, in the UE-transparent case, and may be configured with a plurality of RS port groups, for example, TRPs may inform each other the configurations of RS ports. For another example, each with size 4, in the non-transparent case. An example of partition of the RS port groups in Scenario 2 or 2-A is shown in Table 3. As shown in Table 3, if the number of the RS ports is up to 4, the target RS port group may be {A, B, C, D}, where each of {A, B, C, D} is a RS port, and may be any ports selected from the ports P1-P12. If the number of the RS ports is up to 8, the target RS port group may be {A, B, C, D, E, F, G, H}, where each of {A, B, C, D, E, F, G, H} is a RS port, and may be any ports selected from the ports P1-P12. UE may be configured with any one or two rows in Table 3. For one example, the target RS port group may be {P1, P2, P3, P4} and {P5, P6, P7, P8} or {P1, P3, P5, P7} and {P2, P4, P6, P8} for two TRPs. For another example, the target RS port group may be any two of {P1, P2, P3, P4}, {P5, P6, P7, P8} and {P9, P10, P11, P12} or any two of {P1, P2, P7, P8}, {P3, P4, P9, P10} and {P5, P6, P11, P12} for two TRPs for DMRS configuration type 2.

TABLE 3

| Ports | TRP1 | TRP2 |
|---|---|---|
| Up to 8 (non-transparent) | {A, B, C, D} | {E, F, G, H} |
| Up to 8 (UE-transparent) | {A, B, C, D, E, F, G, H} | |

With regard to Scenario 3 or 3-A, for multiple PDCCHS, the UE may be configured with a plurality of groups with size 4. An example of partition of the RS port groups in Scenario 3 or 3-A is shown in Table 4. As shown in Table 4, if the number of the RS ports is up to 4, the target RS port group may be {A, B, C, D}, where each of {A, B, C, D} is a RS port, and may be any ports selected from the ports P1-P12. If the number of the RS ports is up to 8, the target RS port group may be {A, B, C, D, E, F, G, H}, where each of {A, B, C, D, E, F, G, H} is a RS port, and may be any ports selected from the ports P1-P12. UE may be configured with any one or two rows in Table 4. For one example, the target RS port group may be {P1, P2, P3, P4} and {P5, P6, P7, P8} or {P1, P3, P5, P7} and {P2, P4, P6, P8} for two TRPs. For another example, the target RS port group may be any two of {P1, P2, P3, P4}, {P5, P6, P7, P8} and {P9, P10, P11, P12} or any two of {P1, P2, P7, P8}, {P3, P4, P9, P10} and {P5, P6, P11, P12} for two TRPs for DMRS configuration type 2.

TABLE 4

| Ports | TRP1 | TRP2 |
|---|---|---|
| Up to 8 | {A, B, C, D} | {E, F, G, H} |

According to embodiments of the present disclosure, the plurality of RS ports may be divided into one or more RS port groups in a variety of ways. In some embodiments, each of the RS port groups may be allocated with different resources. Then, the network device may select the target RS port group from the one or more RS port groups. In some embodiments, DMRS from different TRPs may be multiplexed with FDM or configured with different comb offset values or multiplexed with CDM in time domain. For example, ports multiplexed with CDM in time domain may be multiplexed with TD-OCC, as examples shown in FIGS. 3B, 3E and 3F. In this case, no limitation on the DMRS sequence is required.

FIGS. 4A-4E show schematic diagrams of group partition of DMRS ports according to embodiments of the present disclosure, respectively. As shown in FIG. 4A, DMRS may be configured as configuration type 1 with 2 OFDM symbols, as shown with example in FIG. 3B. With 2 different comb offset values, 2 different cyclic shift values and 2 different TD-OCC values, up to 8 ports may be supported. In some embodiments, DMRS ports from different TRPs may be multiplexed with FDM or configured with different comb offset values, RS ports P1-P8 may be divided as a RS port group (referred to as "group 1") including ports {P1, P3, P5, P7} (as shown in FIG. 4B) and another RS port group (referred to as "group 2") including ports {P2, P4, P6, P8}(as shown in FIG. 4C). In some embodiments, DMRS ports from different TRPs may be multiplexed with CDM in time domain, for example DMRS ports may be configured with different TD-OCC values, RS ports P1-P8 may be divided as a RS port group 1 including ports {P1, P2, P3, P4} (as shown in FIG. 4D), and another RS port group 2 including ports {P5, P6, P7, P8} (as shown in FIG. 4E).

In some embodiments, DMRS may be configured as configuration type 2 with 2 OFDM symbols, as shown with example in FIG. 3E or FIG. 3F. With 3 different RE positions in frequency domain, 2 different FD-OCC values and 2 different TD-OCC values, up to 12 ports may be supported. In some embodiments, DMRS ports from different TRPs may be multiplexed with FDM or configured with different RE locations in frequency domain, RS ports P1-P12 may be divided as a RS port group (referred to as "group 1") including ports {P1, P2, P7, P8} and another RS port group (referred to as "group 2") including ports {P3, P4, P9, P10} and another RS port group (referred to as "group 3") including ports {P5, P6, P11, P12}. In some embodiments, DMRS ports from different TRPs may be multiplexed with CDM in time domain, for example DMRS ports may be configured with different TD-OCC values, RS ports P1-P8 may be divided as a RS port group 1 including ports {P1, P2, P3, P4}, and another RS port group 2 including ports {P7, P8, P9, P10}.

In some embodiments, if DMRSs from different TRPs are multiplexed with FDM or configured with different comb offset values or configured with different RE locations in frequency domain or CDM in time domain or configured with different TD-OCC values, the partition may be performed as shown in Table 5.

TABLE 5

| Group size | Groups |
|---|---|
| 4 | {A, B, C, D}, {E, F, G, H} |
| 8 | {A, B, C, D, E, F, G, H} |

Alternatively, in some embodiments, the network device may divide the plurality of RS ports into at least one RS port group. Each of the at least one RS port group transmits the same RS sequence. Then, the network device may select the target RS port group from the at least one RS port group. For example, the DMRSs from different TRPs may have the same base sequence. For example, in this case, no grouping restriction is required.

FIGS. 4D-4E show schematic diagrams of group partition of DMRS ports according to embodiments of the present disclosure, respectively. As shown in FIG. 4A, if RS ports P1-P8 use the same DMRS sequence, there is no restrictions on RS ports in different RS port groups. Thus, there may be a variety of ways for dividing the RS ports P1-P8. In an embodiment, the RS ports P1-P8 may be divided as a RS port group (referred to as "group 1") including ports {P1, P2, P3, P4} (as shown in FIG. 4D) and another RS port group (referred to as "group 2") including ports {P5, P6, P7, P8}(as shown in FIG. 4D).

It is to be understood that the partition illustrated in FIGS. 4A, 4D, and 4E is discussed for example, rather than limitation. In some further embodiments, the RS ports P1-P8 may be divided in other suitable ways. For example, group 1 may include ports {P1, P2, P3, P4}, and group 2 may include ports {P5, P6, P7, P8}. The following Table 6 shows more possible RS port groups when the group size is 4.

TABLE 6

| Group size | Groups |
|---|---|
| 4 | {P1, P2, P3, P4}, {P5, P6, P7, P8} |
|  | {P1, P2, P5, P6}, {P3, P4, P7, P8} |
|  | ... |
|  | {Any 4 ports of all}, {All the rest} |
| 8 | {P1, P2, P3, P4, P5, P6, P7, P8} |

At 220, a configuration of the target RS port group is transmitted to the terminal device. In some embodiments, the configuration of the target RS port group may be included in a high level signaling, for example, a Radio Resource Control (RRC) signaling, a Media Access Control (MAC) signaling, and so on, and transmitted via the high level signaling. Alternatively or in addition, the information of the RS patterns may be transmitted via a dynamic signaling, such as Downlink Control Information (DCI), or other suitable signaling transmitted on the downlink channel.

In Scenario 3, the signaling may from primary TRP and from all the TRPs in cooperation. The identification of the network device (e.g., TRP ID) or virtual ID (vID) may also need to be transmitted in addition to the target RS port group, so as to generate the DMRS base sequence. In an embodiment, the configuration of the target RS port group may be implemented as Table 7.

TABLE 7

| Segment | Value |
|---|---|
| DMRS group1 size | 4 |
| DMRS group1 | {P1, P2, P3, P4} |
| TRP1 ID | n1 |
| DMRS group2 size | 4 |
| DMRS group2 | {P5, P6, P7, P8} |
| TRP2s ID | n2 |

In addition to the above explicit indication of the configuration of the target RS port group, in some embodiments, the configuration may be indicated in an implicit way. For example, the configuration may be deduced by the TRP ID or the virtual ID. For example, the UE may acquire TRP ID or cell ID from synchronization signal or vID from RRC. The ID or vID from a first TRP (for example, TRP1) may be denoted as n1, and the ID or vID from a second TRP (for example, TRP2) may be denoted as n2. Then, the RS port group may be deduced from the following Table 8 (maximum 12 ports), where Offset=P5−P1.

TABLE 8

| Scenario | Ports | n1 | n2 |
|---|---|---|---|
| 1 | Up to 4 | Offset*(n1% 2) + {P1, P2, P3, P4} | |
|  | Up to 8 | Offset*(n1% 2) + {P1, P2, ..., P8} | |
| 2 | Up to 8 | Offset*(n1% 2) + {P1, P2, P3, P4} | Offset*(n2% 2) + {P1, P2, P3, P4} |
|  | Up to 8 | {P1, P2, ..., P8} | |
| 3 | Up to 8 | Offset*(n1% 2) + {P1, P2, P3, P4} | Offset*(n2% 2) + {P1, P2, P3, P4} |

In some embodiments, the configuration of RS port groups and/or RS port orders may be indicated in an implicit way. For example, the configuration may be deduced by the TRP ID or the cell ID or the virtual ID. For example, the UE may acquire TRP ID or cell ID from synchronization signal or vID from RRC. For different TPR ID or cell ID or virtual ID, the RS port groups and/or RS port orders may be different. In one embodiment, when the value of ID is even, the port group may be {A, B, C, D}, where each of {A, B, C, D} is a RS port, and may be ports selected from the ports P1-P12, and when the value of ID is odd, the port group may be {E, F, G, H}, where each of {E, F, G, H} is a RS port, and may be ports selected from the ports P1-P12. And at least one of {E, F, G, H} may be different from any one of {A, B, C, D}. In another embodiment, when the value of ID is even, the port group may be {A, B, C, D, E, F, G, H}, where each of {A, B, C, D, E, F, G, H} is a RS port, and may be ports selected from the ports P1-P12, and when the value of ID is odd, the port group may be {E, F, G, H, A, B, C, D} or {H, G, F, E, D, C, B, A}, where each of {E, F, G, H} is a RS port, and may be ports selected from the ports P1-P12. In another embodiment, the ID or vID from a first TRP or cell may be denoted as n1, and the ID or vID from a second TRP or cell may be denoted as n2. If mod(n1, 3)=0, the port group may be {A, B, C, D}, where each of {A, B, C, D} is a RS port, and may be ports selected from the ports P1-P12, if mod(n1, 3)=1, the port group may be {E, F, G, H}, where each of {E, F, G, H} is a RS port, and may be ports selected from the ports P1-P12, If mod(n1, 3)=2, the port group may be {I, J, K, L}, where each of {I, J, K, L} is a RS port, and may be ports selected from the ports P1-P12, and at least one of the port index in each group may be different from any one of the port index of another group.

Alternatively or in addition, the configuration of the target RS port group may be included in a dynamic signaling, such as Downlink Control Information (DCI), or other suitable signaling transmitted on the downlink channel, and transmitted via the dynamic signaling.

According to embodiments of the present disclosure, the DCI may be predefined to indicate RS port groups in several ways. In an embodiment, the DCI may be implemented according to Table 9.

TABLE 9

| Group | DCI Value | 1 CW | 2 CWs |
|---|---|---|---|
| {P1, P2, P3, P4} | 0 | Port P1 | |
| | 1 | Port P2 | |
| | 2 | Port P3 | |
| | 3 | Port P4 | |
| | 4 | Ports P1-2 | |
| | 5 | Ports P3-4 | |
| | 6 | Ports P1-3 | |
| | 7 | Ports P1-4 | |
| {P1, P2, P3, P4, P5, P6, P7, P8} | 0 | Ports P6-8 | PORT P1-5 |
| | 1 | Ports P7-8 | PORT P1-6 |
| | 2 | Ports P8 | PORT P1-7 |
| | 3 | Ports P1-P4 | PORT P1-8 |
| | 4 | Ports P1-3 | PORTS P4-8 |
| | 5 | Ports P1-2 | PORTS P3-8 |
| | 6 | Ports P1 | PORTS P2-8 |
| | 7 | Ports P5-P8 | Reserved |

As shown in Table 7, if the RS port group is {P1, P2, P3, P4, P5, P6, P7, P8}, upon determining that the DCI value is 0, the UE further determines whether 1 CW or 2 CWs is to be employed. If 1 CW is to be employed, the UE may determine that the target RS port group includes ports P6 to P8. If 2 CWs are to be employed, the UE may determine that the target RS port group includes ports P1 to P5.

It is to be understood that the DCI implementation illustrated in Table 7 is discussed for example, rather than limitation. It can be appreciated that the DCI may be implemented in other suitable forms.

In some embodiments, the network device may receive a RS via the target RS port group from the terminal device based on the configuration.

Figure 5:
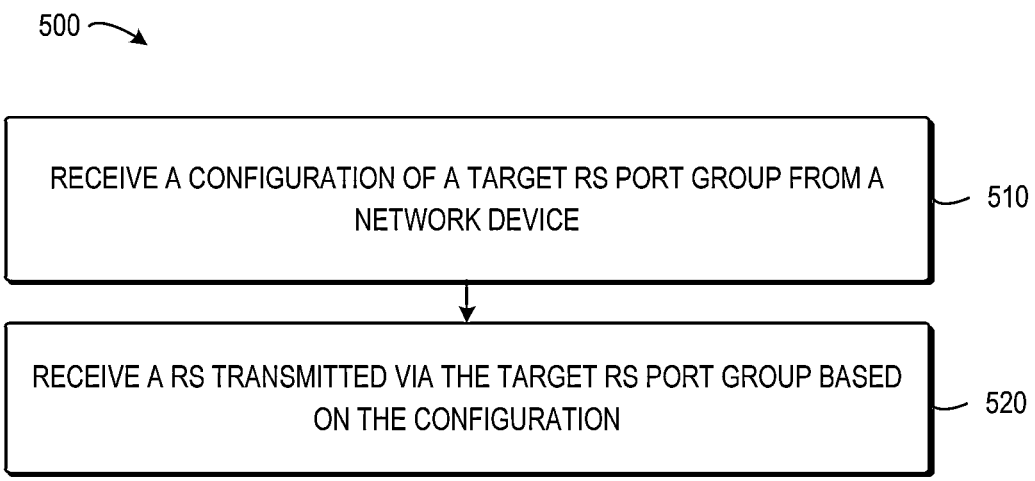
FIG. 5 shows a flowchart of a method 500 for configuring a RS port group in accordance with some embodiments of the present disclosure.

Now reference is made to FIG. 5, which shows a flowchart of a method 500 for configuring a RS port group in accordance with some embodiments of the present disclosure. It would be appreciated that the method 500 may be implemented at a terminal device, for example, the terminal device 120, or any other suitable device.

The method 500 is entered at 510, where the terminal device receives a configuration of a target RS port group from a network device. The target RS port group may be determined from a plurality of RS ports for transmitting a RS to the terminal device, for example, based on the method 200 as discussed above. The plurality of RS ports are associated with at least one network device.

In some embodiments, the terminal device may receive a RS transmitted from the network device via the target RS port group based on the configuration. Alternatively, the terminal device may transmit, to the network device, a RS via the target RS port group based on the configuration.

As discussed above, the configuration of the target RS port group from a network device may be transmitted from the network device via a high level signaling or downlink control information. In some embodiments, the terminal device may receive a high level signaling or downlink control information from the network device, and obtain the configuration of the target RS port group from the received high level signaling or the downlink control information.

In some embodiments, if the configuration of the target RS port group indicates that a plurality of resources are allocated to RS transmission, the terminal device may determine that RSs are to be transmitted from different network devices on different downlink data transmission channels.

Alternatively, or in addition, if the terminal device receives a configuration of a further target RS port group from a further network device (for example, network device 130) other than the network device 110, the terminal device may determine that RSs are to be transmitted from different network devices on different downlink data transmission channels.

In a further aspect of the present disclosure, in order to support scenario switch, there is a need for an indication for multi-TRP PDCCH and/or PDSCH. If a UE receives the indication, it can determine the correct setting, for example, the RS port group and sequences. In an embodiment, the indication may be included in DCI. For example, there may be 1 bit flag in the DCI to act as the indication. Table 10 shows an example of the indication in the DCI.

TABLE 10

| Value | Multi-TRP PDCCH and/or PDSCH |
|---|---|
| 0 | False |
| 1 | True |

As shown in Table 10, if the flag in the DCI is "0", it can be determined that there is no Multi-TRP PDCCH and/or PDSCH. For example, there may be a single PDCCH to be detected. For example, the detected one PDCCH may be the only one to be detected. On the other hand, if the flag is "1", it can be determined that there is Multi-TRP PDCCH and/or PDSCH. For example, there may be multiple PDCCH to be detected. For example, except the detected one PDCCH, there may be another one or more PDCCHs to be detected. For Scenario 3, the same flag may be set by all the TRPs.

Figure 6:
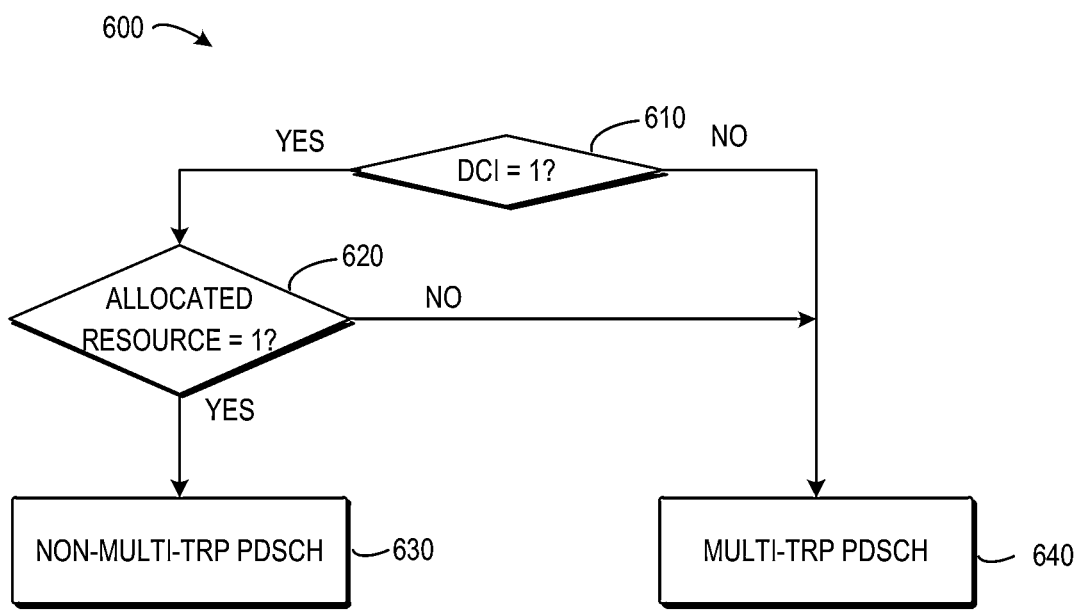
FIG. 6 shows a flowchart of a method 600 for determining TRP(s) in accordance with some embodiments of the present disclosure.

As an alternative, in some embodiments, the indication may be implicit. In this case, the UE may infer whether it is multi-TRP transmission based on received information. FIG. 6 shows a flowchart of a method 600 for determining TRP(s) in accordance with some embodiments of the present disclosure.

At 610, the UE determines whether it receives 1 DCI, that is, downlink control information from 1 TRP. If the UE receives more than 1 DCI, the UE may determine, at 640, that this is a multi-TRP PDSCH, for example, corresponding to Scenario 3. If UE receives only one DCI, the UE further determines, at 620, whether the number of the allocated resource is 1. If so, it can be determined at 630 that this is non-multi-TRP PDSCH, which corresponds to Scenario 1 or Scenario 2 in a UE-transparent way. Otherwise, if more than one resource is allocated, the UE may determine, at 640, that this is a multi-TRP PDSCH, for example, corresponding to Scenario 2 in a non-UE-transparent way. In this way, the UE can infer the Scenarios without explicit indication. As a result, the switch can be performed in a dynamic and flexible way.

Figure 7:
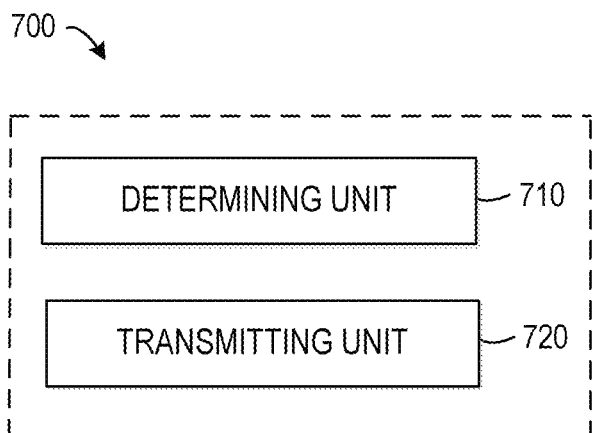
FIG. 7 shows a block diagram of a network device 700 in accordance with some embodiments of the present disclosure.

Now reference is made to FIG. 7, which shows a block diagram of an apparatus 700 in accordance with an embodiment of the present disclosure. It would be appreciated that the apparatus 700 may be implemented at a network device, for example, the network device 110 or 130, or any other suitable device.

As shown, the apparatus 700 includes a determining unit 710 and a transmitting unit 720. The determining unit 710 is configured to: determine a target RS port group from a plurality of RS ports for transmitting a RS to a terminal device, the plurality of RS ports being associated with at least one network device. The transmitting unit 720 is configured to: transmit a configuration of the target RS port group to the terminal device.

In an embodiment, the determining unit 710 may be configured to divide the plurality of RS ports into at least one RS port group, each of the at least one RS port group being allocated with different resources; and select the target RS port group from the at least one RS port group.

In an embodiment, the determining unit 710 may be configured to divide the plurality of RS ports into at least one RS port group, each of the at least one RS port group transmitting the same RS sequence; and select the target RS port group from the at least one RS port group.

In an embodiment, the transmitting unit 720 may be configured to include the configuration of the target RS port group in a high level signaling and transmit the high level signaling to the terminal device, and/or include the configuration of the target RS port group in downlink control information; and transmit the downlink control information to the terminal device.

In an embodiment, the apparatus 700 may further include a receiving unit configured to receive a RS via the target RS port group from the terminal device based on the configuration.

In an embodiment, the configuration of the target RS port group may include at least one of: a size of the target RS port group, RS ports in the target RS port group, an identification of the network device, and a RS sequence.

In an embodiment, the RS includes at least one of: a DMRS, a CSI-RS, a SRS, a PTRS, and a TRS.

Figure 8:
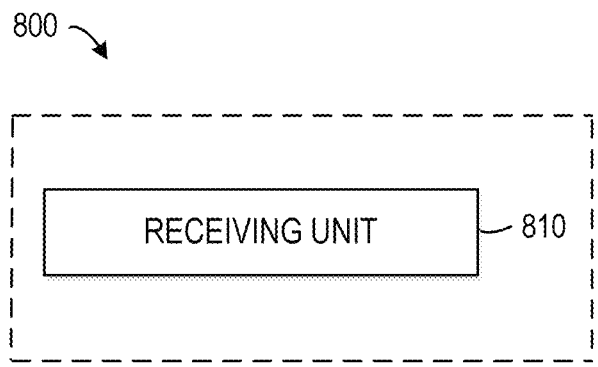
FIG. 8 shows a block diagram of a terminal device 800 in accordance with some embodiments of the present disclosure.

Now reference is made to FIG. 8, which shows a block diagram of an apparatus 800 in accordance with an embodiment of the present disclosure. It would be appreciated that the apparatus 800 may be implemented at a terminal device, for example, the terminal device 120, or any other suitable device.

As shown, the apparatus 800 includes a receiving unit 810 configured to: receive, from a network device, information of one or more RS patterns for a plurality of RS ports. A RS pattern indicates a configuration of a RS to be transmitted to the terminal device via one or more RS ports.

In an embodiment, the receiving unit 810 may be further configured to receive a configuration of a target RS port group from a network device, the target RS port group being determined from a plurality of RS ports for transmitting a RS to the terminal device, the plurality of RS ports being associated with at least one network device.

In an embodiment, the receiving unit 810 may be further configured to receive a high level signaling or downlink control information from the network device; and obtain the configuration of the target RS port group from the high level signaling or the downlink control information.

In an embodiment, the receiving unit 810 may be further configured to receive a RS transmitted via the target RS port group based on the configuration. The apparatus 800 may further comprise a transmitting unit configured to transmit, to the network device, a RS via the target RS port group based on the configuration.

In an embodiment, the apparatus 800 may further comprise a determining unit configured to: in response to the configuration of the target RS port group indicating that a plurality of resources are allocated to RS transmission, determine that RSs are to be transmitted from different network devices on different downlink data transmission channels; and in response to receiving a configuration of a further target RS port group from a further network device, determine that RSs are to be transmitted from different network devices on different downlink data transmission channels.

It is also to be noted that the apparatus 700 or 800 may be respectively implemented by any suitable technique either known at present or developed in the future. Further, a single device shown in FIG. 2 or 5 may be alternatively implemented in multiple devices separately, and multiple separated devices may be implemented in a single device. The scope of the present disclosure is not limited in these regards.

It is noted that the apparatus 700 or 800 may be configured to implement functionalities as described with reference to FIG. 2 or 5. Therefore, the features discussed with respect to the method 200 may apply to the corresponding components of the apparatus 700, and the features discussed with respect to the method 500 may apply to the corresponding components of the apparatus 800. It is further noted that the components of the apparatus 700 or 800 may be embodied in hardware, software, firmware, and/or any combination thereof. For example, the components of the apparatus 700 or 800 may be respectively implemented by a circuit, a processor or any other appropriate device. Those skilled in the art will appreciate that the aforesaid examples are only for illustration not limitation.

In some embodiment of the present disclosure, the apparatus 700 or 800 may comprise at least one processor. The at least one processor suitable for use with embodiments of the present disclosure may include, by way of example, both general and special purpose processors already known or developed in the future. The apparatus 700 or 800 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 700 to at least perform according to the method 200 as discussed above and to cause the apparatus 800 to at least perform according to the method 500 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 7 or 8 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

Figure 9:
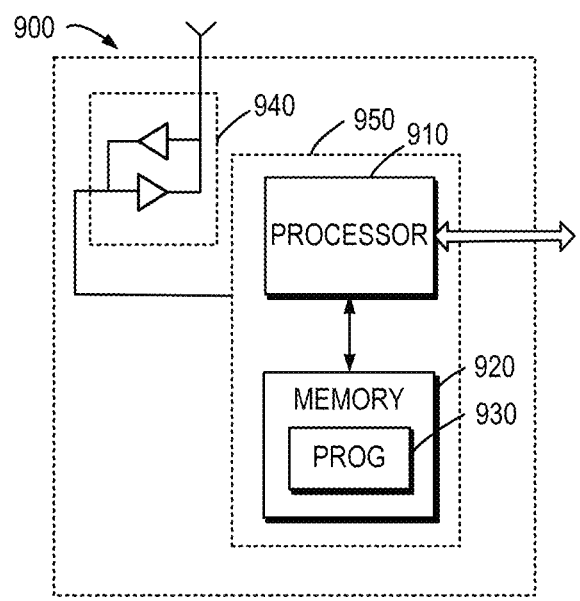
FIG. 9 is a simplified block diagram of a device 900 that is suitable for implementing embodiments of the present disclosure.

FIG. 9 is a simplified block diagram of a device 900 that is suitable for implementing embodiments of the present disclosure. As shown, the device 900 includes one or more processors 910, one or more memories 920 coupled to the processor(s) 910, one or more transmitters and/or receivers (TX/RX) 940 coupled to the processor 910.

The processor 910 may be of any type suitable to the local technical network, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 920 stores at least a part of a program 930. The TX/RX 940 is for bidirectional communications. The TX/RX 940 has at least one antenna to facilitate communication, though in practice a terminal device or a network device mentioned in this disclosure may have several ones. The communication interface may represent any interface that is necessary for communication with other network elements.

The program 930 is assumed to include program instructions that, when executed by the associated processor 910, enable the device 900 to operate in accordance with the embodiments of the present disclosure, as discussed herein with reference to FIGS. 2 and 5. That is, embodiments of the present disclosure can be implemented by computer software executable by the processor 910 of the device 900, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method performed by a terminal device, comprising:
receiving information via a plurality of Physical Downlink Control Channels (PDCCHs) for scheduling a plurality of Physical Downlink Shared Channels (PDSCHs) from a plurality of Transmission Reception Points (TRPs);
receiving information via the plurality of PDSCHs from the plurality of TRPs; and
receiving a plurality of Demodulation Reference Signals (DMRSs) for the plurality of PDSCHs from the plurality of TRPs,
wherein configurations of the plurality of DMRSs from the plurality of TRPs are same,
wherein one of the configurations of the plurality of DMRSs is a DMRS configuration with respect to at least one of a DMRS configuration type, a first number of symbols for a front-loaded DMRS, and a second number of symbols for an additional DMRS.

2. A terminal device comprising a processor configured to:
receive information via a plurality of Physical Downlink Control Channels (PDCCHs) for scheduling a plurality of Physical Downlink Shared Channels (PDSCHs) from a plurality of Transmission Reception Points (TRPs);
receive information via the plurality of PDSCHs from the plurality of TRPs; and
receive a plurality of Demodulation Reference Signals (DMRSs) for the plurality of PDSCHs from the plurality of TRPs,
wherein configurations of the plurality of DMRSs from the plurality of TRPs are same,
wherein one of the configurations of the plurality of DMRSs is a DMRS configuration with respect to at least one of a DMRS configuration type, a first number of symbols for a front-loaded DMRS, and a second number of symbols for an additional DMRS.

3. A method performed by a network device, comprising:
transmitting information via a plurality of Physical Downlink Control Channels (PDCCHs) for scheduling a plurality of Physical Downlink Shared Channels (PDSCHs) to a terminal device;
transmitting information via the plurality of PDSCHs to the terminal device; and
transmitting a plurality of Demodulation Reference Signals (DMRSs) for the plurality of PDSCHs to the terminal device,
wherein configurations of the plurality of DMRSs are same,
wherein one of the configurations of the plurality of DMRSs is a DMRS configuration with respect to at least one of a DMRS configuration type, a first number of symbols for a front-loaded DMRS, and a second number of symbols for an additional DMRS.

4. The method of claim 1, wherein the DMRS configuration type is DMRS configuration type 1 or DMRS configuration type 2.

5. The method of claim 4, wherein the DMRS configuration type is configured by a Radio Resource Control (RRC) signaling.

6. The method of claim 1, wherein the number of symbols for the front-loaded DMRS is 1.

7. The method of claim 1, wherein the number of symbols for the front-loaded DMRS is configured by a Radio Resource Control (RRC) signaling and/or via a Downlink Control Information (DCI).

8. The method of claim 1, wherein the number of symbols for the additional DMRS is 0.

9. The method of claim 8, wherein the number of symbols for the additional DMRS being equal to 0 is configured by a Radio Resource Control (RRC) signaling.

10. The terminal device of claim 2, wherein the DMRS configuration type is DMRS configuration type 1 or DMRS configuration type 2.

11. The terminal device of claim 10, wherein the DMRS configuration type is configured by a Radio Resource Control (RRC) signaling.

12. The terminal device of claim 2, wherein the number of symbols for the front-loaded DMRS is 1.

13. The terminal device of claim 2, wherein the number of symbols for the front-loaded DMRS is configured by a Radio Resource Control (RRC) signaling and/or via a Downlink Control Information (DCI).

14. The terminal device of claim 2, wherein the number of symbols for the additional DMRS is 0.

15. The terminal device of claim 14, wherein the number of symbols for the additional DMRS being equal to 0 is configured by a Radio Resource Control (RRC) signaling.

16. The method of claim 3, wherein the DMRS configuration type is DMRS configuration type 1 or DMRS configuration type 2.

17. The method of claim 16, wherein the DMRS configuration type is configured by a Radio Resource Control (RRC) signaling.

18. The method of claim 3, wherein the number of symbols for the front-loaded DMRS is 1.

19. The method of claim 3, wherein the number of symbols for the front-loaded DMRS is configured by a Radio Resource Control (RRC) signaling and/or via a Downlink Control Information (DCI).

20. The method of claim 3, wherein the number of symbols for the additional DMRS is 0.

21. The method of claim 20, wherein the number of symbols for the additional DMRS being equal to 0 is configured by a Radio Resource Control (RRC) signaling.

* * * * *